No. 850,676. PATENTED APR. 16, 1907.
D. P. SANDERS.
BRICK MACHINE.
APPLICATION FILED FEB. 20, 1907.

3 SHEETS—SHEET 1.

WITNESSES:

David P. Sanders, INVENTOR.

By C. A. Snow & Co.

ATTORNEYS

No. 850,676.

PATENTED APR. 16, 1907.

D. P. SANDERS.
BRICK MACHINE.
APPLICATION FILED FEB. 20, 1907.

3 SHEETS—SHEET 2.

WITNESSES:

David P. Sanders, INVENTOR.

By C. A. Snow & Co.

ATTORNEYS

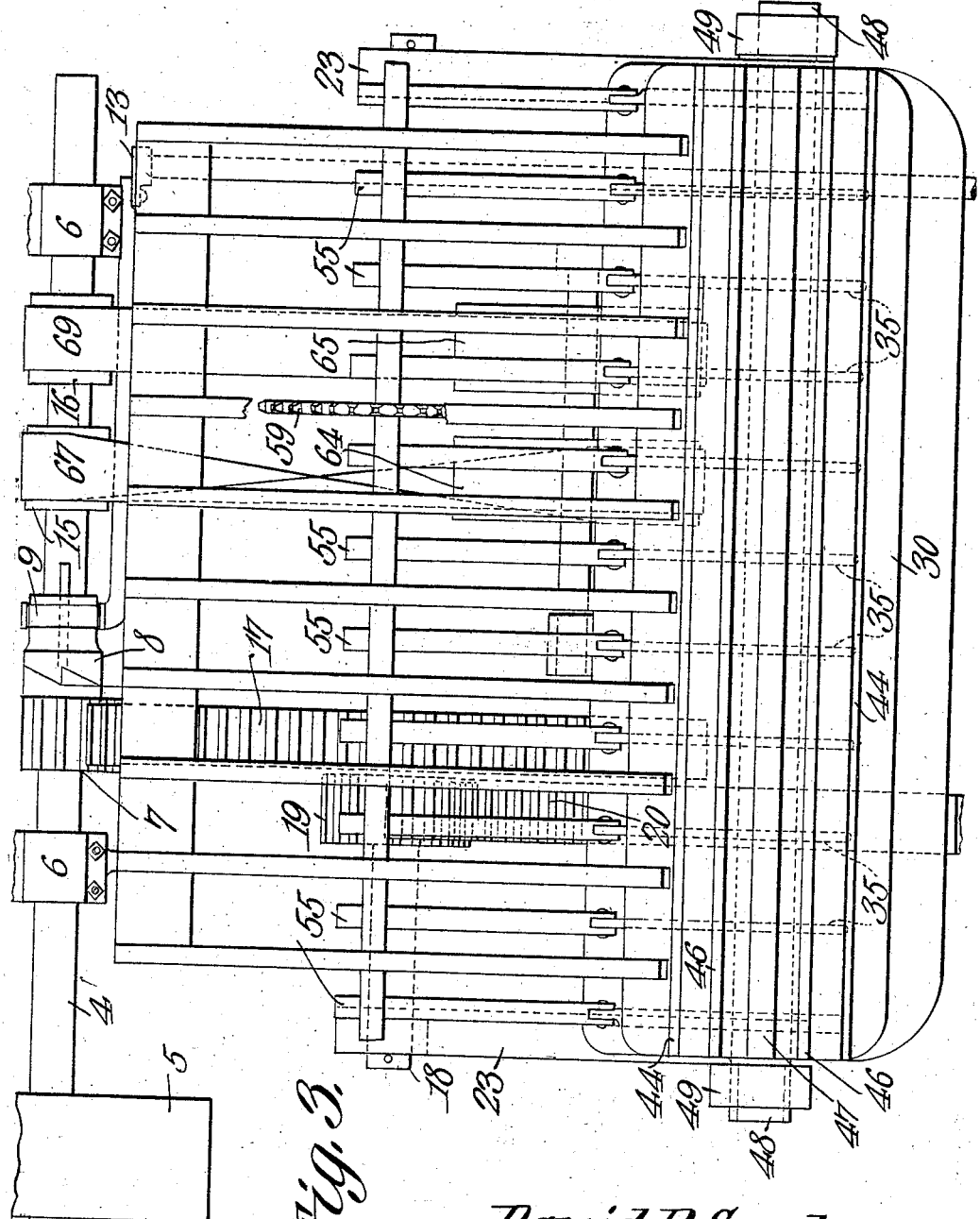

UNITED STATES PATENT OFFICE.

DAVID P. SANDERS, OF READING, PENNSYLVANIA.

BRICK-MACHINE.

No. 850,676.  Specification of Letters Patent.  Patented April 16, 1907.

Application filed February 20, 1907. Serial No. 358,432.

*To all whom it may concern:*

Be it known that I, DAVID P. SANDERS, a citizen of the United States, residing at Reading, in the county of Berks and State of Pennsylvania, have invented a new and useful Brick-Machine, of which the following is a specification.

This invention has reference to improvements in brick-machines; and its object is to produce a machine wherein a mass of clay inserted into the machine is divided into blocks which are compressed into bricks of standard size, while the molds are subjected to the action of steam heat to prevent the material from sticking to them.

The invention consists, essentially, in a pressing-head having a chamber for the reception of the clay to be formed into bricks, means for dividing the clay into blocks of appropriate size, and means for compressing the blocks to a standard size suitable for producing bricks of standard size when burned.

The invention will be fully understood from the following detailed description, wherein reference is made to the accompanying drawings, forming part of this specification, in which—

Figure 1:
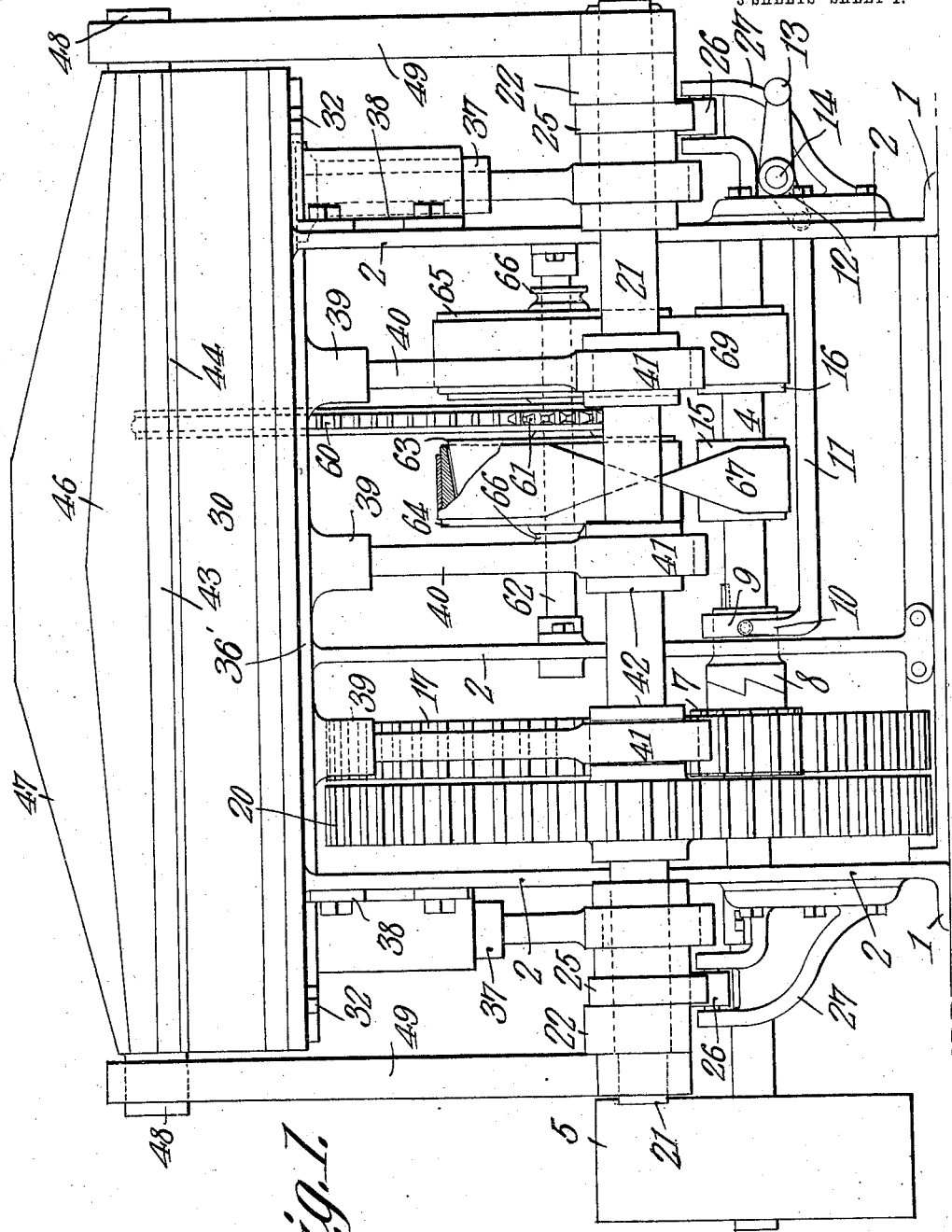
Figure 2:
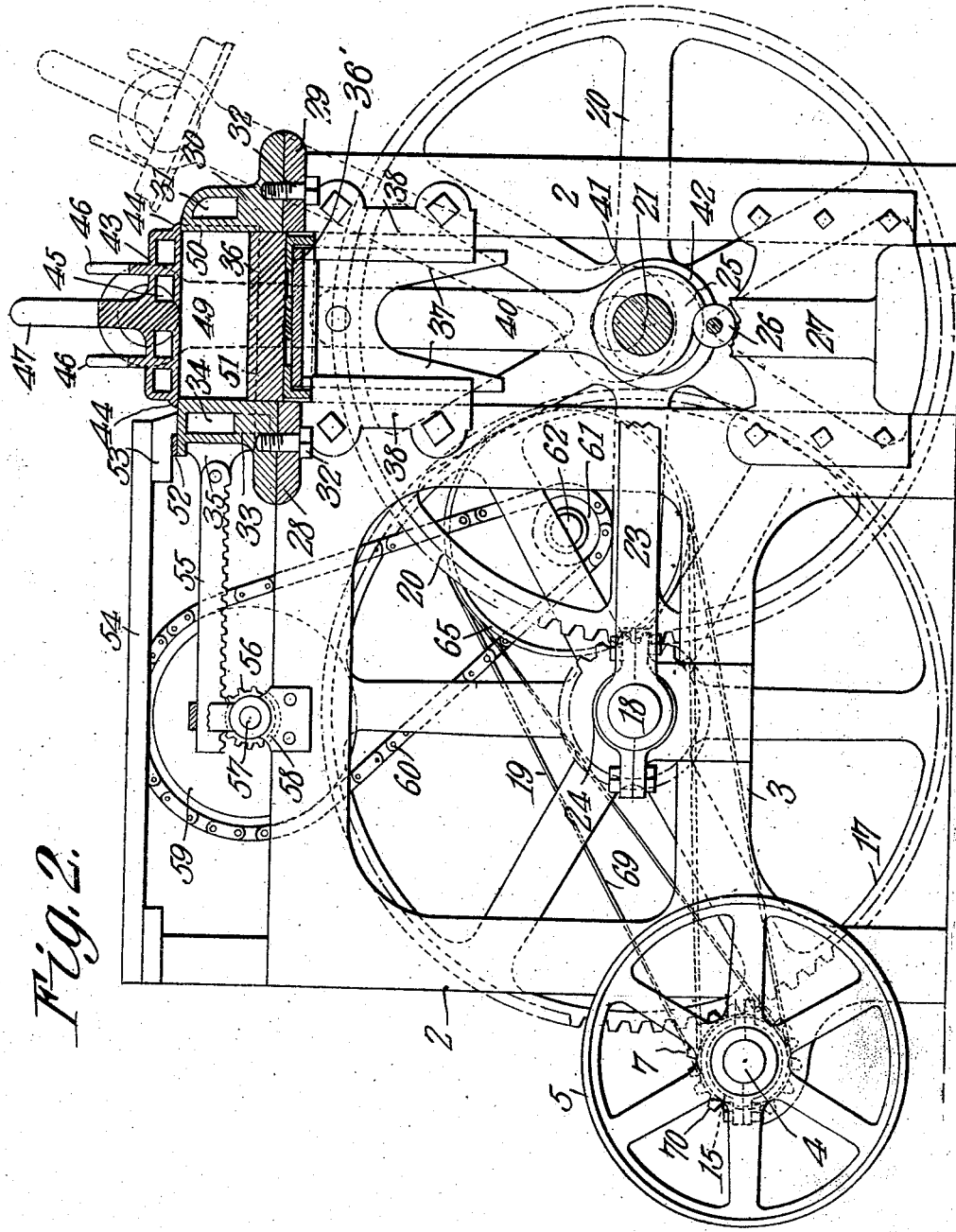

Figure 1 is a side elevation of the improved brick-machine. Fig. 2 is an end elevation of the same with parts shown in section, and Fig. 3 is a top plan view.

Referring to the drawings, there is shown a suitable base-plate 1, from which rise standards 2, which are joined by cross-pieces 3, all constituting the framework of the machine. At one side of the framework 2 is a shaft 4, constituting the power-shaft of the machine, and this shaft has on one end a pulley 5, receiving power from any suitable source, as by a belt, which, however, is not shown. The shaft 4 is mounted in suitable journal-bearings 6 and carries between the bearings a pinion 7, loosely mounted upon the shaft, but capable of being secured thereto for joint rotation by a clutch 8, which may be of the usual toothed type, and provided with an operating-collar 9, engaged by the forked ends 10 of a rod 11, fast on one end 12 of an operating-lever 13, pivotally mounted on the frame at 14, as shown. The shaft 4 also carries two belt-pulleys 15 16, which will be hereinafter referred to. The pinion 7 on the shaft 4 is in engagement with a large gear-wheel 17, mounted upon a shaft 18, journaled in suitable bearings upon the framework of the machine. This shaft 18 also carries a pinion 19, which in turn is in mesh with another large gear-wheel 20, mounted upon a shaft 21, parallel with the shaft 18 and having bearings 22 at each end, coupled by links 23 to boxes 24 on the shaft 18. Adjacent to the bearings 22 the shaft 21 carries cams 25 25, resting on rollers 26 26, journaled in the upper ends of brackets 27 27, fast on uprights 2 of the framework. The shaft 21 is therefore free to rise and fall and when rotated does rise and fall through a distance determined by the supporting-cams 25, resting on the rollers 26.

Extending across the upper side of the framework above the shaft 21 and the gear-wheel 20 thereon are two parallel spaced shelves 28 29, constituting the supporting and guiding members of the brick forming and pressing mechanism, which is in the form of a trough of appropriate shape with two fixed and two movable walls. One wall is formed by a casting 30, having throughout its length a duct or chamber 31 for the circulation of steam, and this casting 30 is secured to the shelf 29 by bolts 32. The other shelf 28 has secured to it by similar bolts 32 a casting 33, also provided with a steam-duct 34, and at appropriate intervals this casting 33 is slotted for the passage of sliding division-plates 35, to be hereinafter referred to. The two castings 30 and 33 constitute the side walls of the trough of the receptacle in which the clay to be formed into bricks is placed and where it is divided into blocks of proper size, as will hereinafter appear.

It will be understood, of course, that appropriate end walls are also provided for the trough or molding-space.

The bottom of the trough or molding-space is formed by a pallet 36 of such length and width as to fit snugly within the space between the facing walls of the castings 30 and 33 and to move therein, the pallet 36 being carried by a head or follower 36', which is movable into the space to cause the compression of the clay into blocks of suitable size. Near each end the follower 36' is provided with downwardly-extending wings 37, moving between guide-plates 38, fast on the framework of the machine, and at appropriate intervals the follower is formed on the bottom with bosses 39, in which are pivoted pitmen 40, having their lower ends formed into collars 41, fitting cams 42 upon the shaft 21, the arrangement being such that on the rotation of the shaft 21 all the cams will act simultaneously to move the pitmen 40 in the same direction, and so move the follower and pallet into or out of the compression-space.

The cover of the compression-space is formed by a cap 43 of sufficient width to span the space between the upper ends of the sides 30 and 33 of the compression-space, and the cap is provided with longitudinal flanges 44, overlapping sufficiently the upper ends of the sides 30 and 33 to form a tight joint therewith and to properly support the cap. This cap has longitudinal passages 45 and is strengthened on the top by longitudinal ribs 46 and 47, the latter rib 47 being centrally located and the other ribs 46 being located on each side of the central rib. The passages 45 through the cap are for the circulation of steam.

The cap 43 is provided at each end with trunnions 48, receiving the upper ends of links 49, the lower ends of which encircle and are carried by the shaft 21, the construction being such that any movement of the shaft up or down will be participated in by the cap 43.

Returning now to the division-plates 35, these plates are of sufficient number and so placed as to divide the contents of the compression-chamber into blocks of such width as shall be suitable for the finished bricks. These plates enter appropriate slots through the side 33 of the compression-chamber, as heretofore stated, and find seats at the other ends in vertical grooves 50 in the face of the side 30, as indicated by dotted lines in Figs. 2 and 3, and also find seats in grooves 51 across the bottom of the pallet 36 when the latter is moved toward the cap-plate 43, these grooves being indicated by dotted lines in Fig. 2. These division-plates travel upon the bottom of the grooves in the side wall 33 of the compression-chamber and against a plate 52, extending laterally across the machine under supports 53, resting on the side casting 33 and supporting a table 54, suitably located for the placing of the clay in the compression-chamber and for receiving the blocks when pressed. The division-plates 35 are pivotally connected to rack-bars 55, which in turn are in engagement with pinions 56, mounted upon a shaft 57 upon suitable bearings 58, fast on the frame of the machine. This shaft is driven by a sprocket-wheel 59, through the medium of a sprocket-chain 60, coming from a sprocket-pinion 61, mounted upon a counter-shaft 62, having suitable bearings in the frame of the machine. The shaft 62 also carries one member 63 of a friction-drive, the other member comprising two belt-pulleys 64 65, movable longitudinally on said shaft into and out of engagement with the member 63 of the clutch. Means for moving these belt-pulleys 64 and 65 is not shown, but is simply indicated by the grooved hubs 66, it being understood that any suitable lever connection may be used for the purpose. The pulley 64 receives motion in one direction by a belt 67, passing over a small pulley 15 on the shaft 4 of the machine, and the pulley 65 receives motion from a belt 69, passing over another pulley 16 on the shaft 4 of the machine. One of these belts is crossed as indicated, so that the motion imparted to the shaft 62 will be in one direction when the member 64 of the friction-clutch is in engagement with the member 63 and in the other direction when the member 65 is in engagement with the member 63 of the friction-clutch. Now let it be assumed that a charge of clay has been put into the compression-space, that the division-plates 35 are in said space, and that the cap 43 is in place and also that the clutch members 64 and 65 are out of engagement with the clutch member 63 and the clutch 8 has also been moved to bring its two members out of engagement and let it be assumed that the shaft 4 is constantly running. The clutch 8 is now manipulated to couple the pinion 7 to the drive-shaft 4, when the gear-wheels 17 and 20 will be put in operation and the cams 25 on the shaft 21 will be rotated, as well as the cams 42 thereon. These cams 25 and 42 are so related in position that the shaft 21 will be allowed to fall until the cap 43 is in firm engagement with the top of the compression-chamber. The cams 42 now move the pitmen 40 to move the follower and pallet up into the compression-chamber and thereby compress the divided charge therein into blocks of appropriate thickness. It will be understood that steam has been admitted through the passages 31, 34, and 45 and the molds have been heated to such a degree as to prevent the material from sticking. After the material has been compressed into blocks the shaft 21 is further rotated and lifted by the cams 25 and by its upward movement lifts the cap 43 above the sides of the compression-chamber, so that it may be swung to the right, as viewed in Fig. 2, and thus expose the upper sides of the blocks in the compression-chamber. The appropriate clutch member 64 or 65 may now be brought into engagement with the other clutch member 63, and all the division-plates 35 may be withdrawn from the compression-chamber, after which the compressed blocks may be removed and a fresh charge may be placed in the compression-chamber, and the operation may be repeated from time to time as often as desired.

It will be understood, of course, that by the term "brick" I mean the ordinary rectangular block used for building purposes, of whatever size or shape the same may be, and it will be further understood that the machine is adapted for the compression of clay or other moldable material into tiles or any other form desired and is not specifically limited to the production of ordinary building-bricks.

I claim—

1. In a brick-machine, a compression-chamber having fixed side walls and movable top and bottom walls, a rotatable power-shaft movable to and from said compression-chamber, connections between the shaft and the top wall of the compression-chamber participating in the movement of the shaft with relation to its axis but not participating in its rotative movement, cams on the shaft and rotatable therewith, and connections from the cams to the bottom wall of the compression-chamber for moving the said bottom wall independent of the movement of the shaft toward and from said compression-chamber.

2. In a brick-machine, a shaft having cams engaging fixed supports to move said shaft laterally, other cams upon the shaft, a follower engaged by said other cams, a compression-chamber having fixed side walls and entered by said follower, and a cap for said compression-chamber carried by said shaft at a fixed distance therefrom.

3. In a brick-machine, a shaft having cams thereon engaging fixed supports, a compression-chamber having fixed side walls, a cap for said chamber, link connections between the shaft and said cap, a follower forming the bottom of said compression-chamber, other cams upon the shaft, and connections between the follower and said cams for moving the follower with relation to the shaft.

4. In a brick-machine, a power-shaft, a pinion thereon, a clutch for connecting the pinion to the power-shaft, a gear-wheel on another shaft in the machine meshing with said pinion, another gear-wheel meshing with the pinion on the second shaft, a third shaft supporting the second gear-wheel, link connections between the second and third shafts whereby the third shaft may be moved about the second shaft's axis, a compression-chamber having fixed side walls, a cap for the compression-chamber movable with the third shaft at a fixed distance therefrom, a follower constituting the bottom of the compression-chamber, and cams on the third shaft for operating the follower.

5. In a brick-machine, a compression-chamber, division-plates movable into and out of the same, and means for operating said division-plates comprising a rack for each division-plate, a series of pinions engaging the racks, driving means for the pinions, a power-shaft, and a two-way clutch mechanism between the power-shaft and the pinion drive-shaft.

6. In a brick-machine, a compression-chamber, division-plates therefor, racks connected to said division-plates, pinions controlling said racks and mounted on a common drive-shaft, a power-shaft, and a clutch device between the power-shaft and the pinion-shaft comprising a friction member in constant connection with the pinion-shaft and two friction members movable in opposite directions and arranged for engagement with the common member of the friction device.

In testimony that I claim the foregoing as my own I have hereto affixed my signature in the presence of two witnesses.

DAVID P. SANDERS.

Witnesses:
 HENRY S. WAGNER,
 H. B. GIBBLE.